United States Patent
Mizuno et al.

[11] Patent Number: 5,378,206
[45] Date of Patent: Jan. 3, 1995

[54] TOOTHED BELT HAVING TWISTED CORE WIRE

[75] Inventors: Takahide Mizuno; Nobutaka Osako; Takeshi Murakami, all of Kobe; Satoshi Murakami, Kakagawa, all of Japan

[73] Assignee: Mitsuboshi Belting Ltd., Kobe, Japan

[21] Appl. No.: 979,558

[22] Filed: Nov. 20, 1992

Related U.S. Application Data

[63] Continuation of Ser. No. 736,224, Jul. 26, 1991, abandoned.

[30] Foreign Application Priority Data

Apr. 27, 1990 [JP] Japan ................... 2-112247

[51] Int. Cl.⁶ .................. F16G 5/08; F16G 5/20
[52] U.S. Cl. .................. 474/263; 474/205; 474/268
[58] Field of Search ............ 474/204, 205, 263, 264, 474/266, 268; 57/902, 236, 237, 241, 242

[56] References Cited

U.S. PATENT DOCUMENTS

| | | | |
|---|---|---|---|
| 2,755,214 | 7/1956 | Lyons | 57/902 |
| 3,554,260 | 1/1971 | Klamp | 57/902 |
| 3,661,692 | 5/1972 | Berczi | 57/242 |
| 4,083,260 | 4/1978 | Carlson | 474/263 |
| 4,498,891 | 2/1985 | Mashimo | 474/268 |
| 4,652,252 | 3/1987 | Westhoff | 57/237 |
| 4,721,496 | 1/1988 | Yokoyama | 474/268 |
| 4,787,200 | 11/1988 | Inada | 57/902 |

FOREIGN PATENT DOCUMENTS 81536  5/1985  Japan ................... 474/263

OTHER PUBLICATIONS

*Man–Made Fibers Science and Technology*, vol. 3, Editors Mark et al.

Cuthbertson et al. *Elastomeric (Spandex) Fibers*, Interscience Publishers pp. 401–407.

Primary Examiner—Flemming Saether
Attorney, Agent, or Firm—Wood, Phillips, VanSanten, Hoffman & Ertel

[57] ABSTRACT

A toothed rubber belt has teeth, a rubber back and a core wire imbedded in the rubber back. The core wire has lower twists of about 10.5 to about 13.5 times/10 cm and an upper twist of about 6.5 to about 9.5 times/10 cm. Preferably, the wire core is made of glass having a construction of ECG 150 3/6 to 3/13. The core wire having the specified number of twists improves the physical properties of the belt.

15 Claims, 2 Drawing Sheets

TOOTHED BELT HAVING TWISTED CORE WIRE

CROSS REFERENCE TO RELATED APPLICATION

This is a continuation of application Ser. No. 07/736,224, filed Jul. 26, 1991, which is now abandoned.

TECHNICAL FIELD

The invention relates to a toothed belt and, more particularly, to a toothed belt in which the number of twistings of a core wire is specified to improve its durability.

BACKGROUND OF THE INVENTION

Toothed belts are made of rubber and can have a tensile core wire embedded therein.

The toothed belt can provide a positive drive force without the slipping which can occur with a flat belt or a V-belt. Since the toothed belt also has an advantage of not requiring lubrication, as is required of a gear or a chain drive, its demand and utilization has been greatly increased. The toothed belts are frequently employed in positive drives of overhead cam (OHC) engines for automobiles and extend between pulleys on multiple shafts.

In an OHC engine, the toothed belts are used under severe conditions, e.g. high load and elevated temperature. Therefore, the belt is subjected to flex fatigue and elongation. When the toothed belt used under such severe conditions is elongated about 0.1% or more, the engagement of the belt with the pulleys is deteriorated so that the belt has a tendency to jump off of a pulley with undesirable consequences.

The toothed belt is affected by the characteristics, i.e., flex fatigue and elongation, of the core wire in the belt.

Glass fiber cords each having a high strength, which contributes to a reduction in flex fatigue, and a small elongation have been employed as tensile core wires of a conventional toothed belt. Belts used in an OHC engine for an automobile can have a glass fiber cord which normally is an ECG 150 3/11 or 3/13 having 7.0 to 10.0 times/10 cm upper twists. ECG identifies an electrical (nonalkaline) glass that is a continuous filament and that a single filament has a diameter of about 9 microns. The "150" indicate that a basic filament represents 15,000 yd/ld. Both of the "3"s indicate that 3 filaments are gathered together and first or lower-twisted to form a rope. The "11" and "13" indicate the number of ropes gathered together and final upper-twisted to form the cord. For example, a toothed belt which uses hydrogenated nitrile rubber and has a glass fiber cord having 7 to 10 times/10 cm lower twists and 7 to 9 times/10cm upper twists is disclosed in Japanese Patent Laid-Open No. 62-159827.

However, when the toothed belt is fed under a high load and around small diameter pulleys on multiple shafts in the OHC engine, the glass fiber cord disclosed in this Japanese Patent is elongated, and the tension on the belt is lowered. There are various causes of the elongation and lowering of the tension. It has been discovered that one of the causes is related to the cord configuration and particularly the number of lower twists.

Belts were tested by being run on an apparatus having multiple shafts with each shaft having a pulley and the belt extending between the pulleys. A first toothed belt, having the rubber teeth and the rubber back made of a rubber composition of hydrogenated nitrile rubber and chlorosulfonated polyethylene, a glass core wire having 7 to 10 times/10 cm lower twists, and the rubber teeth covered with canvas, was contracted during its running so that the tension of the belt was raised. Analysis of the belt after running indicated the wear of the canvas at the roots of the teeth was accelerated, and the dedenda of the teeth were visibly cracked. A second toothed belt made of the same rubber composition, a glass core wire having 14 to 18 times/10 cm lower twists and canvas was elongated during its feeding so that the tension of the belt was lowered. After being run under the same conditions of the first belt, analysis of the second belt indicated that the dedenda of the teeth of the second belt cracked early.

An object of this invention is to provide a toothed belt in which glass fiber cords formed of a cord configuration providing low elongation and flex fatigue are employed as core wires and variation in the tension of the belt during running is reduced to provide flex fatigue resistance.

SUMMARY OF THE INVENTION

The present invention is directed to a toothed belt having teeth, a rubber back and at least one core wire completely or partially imbedded in the rubber back. The core wire has a lower twist of about 10.5 to about 13.5 times/10 cm and an upper twist of about 6.5 to about 9.5 times/10 cm. Preferably, the core wire is made of glass having a construction of ECG 150 3/6 to 3/13.

The rubber utilized can be any rubber, and preferably is a rubber having good thermal aging resistance.

The core wire can be treated with a resorcin-formalin-rubber latex (RFL) or a rubber paste to improve the adhesion of the core wire to the rubber. Preferably, the RFL is applied prior to the lower twisting and the rubber paste is applied after the upper twisting.

The rubber belt can be covered with a canvas cover that is preferably applied over the teeth of the belt.

The rubber belt having the core wire embedded therein exhibits a minimal elongation during use, has good flex resistance, exhibits no cracking at the dedenda of the teeth even after use under tension for a long time periods, has good residual strength and the canvas cover, when present, has good wear resistance.

Numerous other advantages and features of the present invention will become readily apparent from the following detailed description of the invention, the figures and the appended claims.

DETAILED DESCRIPTION OF THE PREFERRED EMBODIMENTS

Although this invention is susceptible to embodiment in many different forms, preferred embodiments of the invention are shown. It should be understood, however, that the present disclosure is to be considered as an exemplification of the principles of this invention and is not intended to limit the invention to the embodiments illustrated.

A toothed belt of this invention has a plurality of rubber teeth disposed along a longitudinal direction thereof, a rubber back having buried therein core wires, and preferably a canvas cover over the surfaces of the rubber teeth. The rubber teeth and the rubber back are made of a heat resistant rubber composition that can be hydrogenated nitrile rubber, chlorosulfonated polyethylene rubber or alkylated chlorosulfonated polyethylene rubber. The core wires are made of glass fiber cords each having a first or lower twist of about 10.5 to about 13.5 times/10 cm and a final or upper twist of about 6.5 to about 9.5, preferably about 8, times/10 cm.

The term "lower twist", as used in its various grammatical forms, refers to the twisting of the filaments to form a rope and is synonymous with original twist and first twist.

The term "upper twist", as used in its various grammatical forms, refers to the twisting of the ropes to form the cord and is synonymous with final twist.

The glass fiber cord preferably has a construction of ECG 150 3/6 to 3/13, most preferably ECG 150 3/11 to 3/13.

Figure 1:
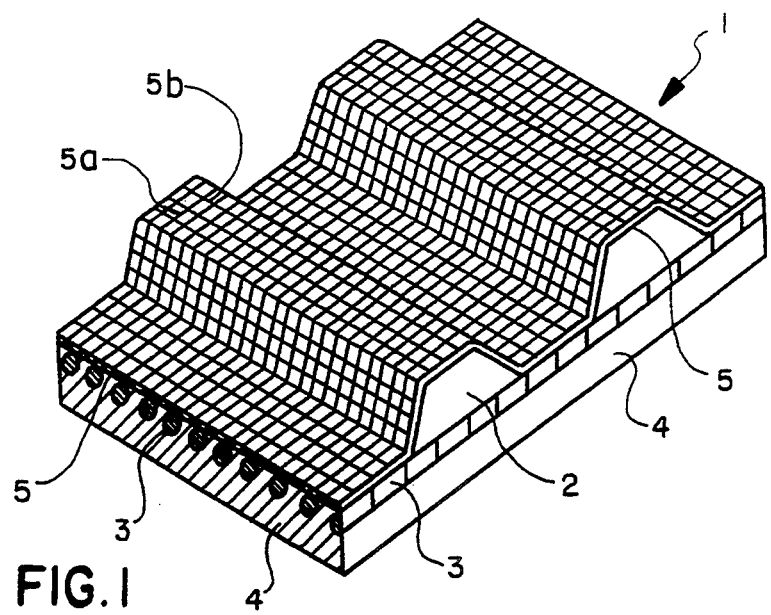
FIG. 1 is a perspective sectional view of a toothed belt according to this invention.

FIG. 1 is a perspective sectional view of a toothed belt 1 according to this invention. The toothed belt 1 is composed of a plurality of rubber teeth 2 formed along the longitudinal direction of the belt 1 and a rubber back 4 in which core wires 3 made of glass fiber cords are buried. A canvas cover 5 is adhered to the exposed surface of the rubber teeth 2.

The rubber teeth 2 and the rubber back 4 are formed of rubber having good thermal aging resistance. Representative of such rubbers are chlorosulfonated polyethylene rubber (CSM), alkylated chlorosulfonated polyethylene rubber (ACSM) and hydrogenated acrylonitrile-butadiene rubber (called "hydrogenated nitrile rubber", represented by "H-NBR") in which 80% or more hydrogen is added to the double bond of acrylonitrile-butadiene rubber.

A conventional acid acceptor is preferably present when the rubber is CSM which can improve the heat resistance of the rubber. A representative acid acceptor is a magnesium oxide-aluminum oxide solid solution. The magnesium oxide-aluminum oxide solid solution is generally represented by $Mg_{0.7}Al_{0.3}O_{1.15}$. Representative of suitable magnesium oxide-aluminum oxide solid solutions are KW-2000 and KW-2100, both commercially available from Kyowa Kagaku Kogyo Co., Ltd. and the like.

The acid acceptor is present in an amount effective to remove sufficient amounts of the hydrogen chloride generated during crosslinking of the CSM so that crosslinking points of the CSM are not reduced to a level resulting in the predetermined vulcanized compound, i.e., a compound having the desired number of crosslinking points, not being obtained which causes the toothed belt to lack heat resistance and crack early. The amount of acid acceptor utilized should also not exceed that amount which causes the Mooney viscosity of the CSM to be increased to a point that creates processing problems. The amount of the magnesium oxide-aluminum oxide utilized is about 1 to about 50, preferably about 4 to about 20, parts by weight (pts.wt.) to 100 pts.wt. of chlorosulfonated polyethylene. If the magnesium oxide-aluminum oxide solid solution is less than about 1 pt.wt., hydrogen chloride generated during crosslinking cannot be sufficiently removed. If the magnesium oxide-aluminum oxide solid solution exceeds about 50 pts.wt., the Mooney viscosity of the CSM is remarkably raised which causes a problem in processing. Therefore, the rubber composition of chlorosulfonated polyethylene used for the toothed belt of this invention preferably has added thereto the magnesium oxide-aluminum oxide solid solution in the above-described range so as to improve the belt life and to obtain desirable processing properties.

The alkylated chlorosulfonated polyethylene rubber is produced from a low density, straight-chain polyethylene that is chlorosulfonated so that its chlorine content is within the range of about 15 to about 45 weight percent (wt.%) and sulfur content is within the range of about 0.5 to about 2.5 wt.%. Since the ACSM includes an alkyl side chain, the crystallinity of the polyethylene of the main chain is lowered, and the ACSM hence has rubber-like properties. Since the ACSM is scarcely crystallized in a low temperature range ($-10°$ C. or lower), its rubber elasticity is maintained providing excellent cold resistance.

For the canvas cover 5, plain weave fabric, twill fabric, satin fabric, and the like, having contraction and expansion properties in a weft direction (in a belt longitudinal direction) can be employed. In the case of plain weave canvas, since the wefts 5a and the warps 5b are vertically alternately intersected and laminated, waveform-shaped intersection points of the wefts 5a and the warps 5b are continuously formed in the weft and the warp directions. With twill or satin fabric, a plurality of wefts and warps form waveform shapes with intersection points, the number of waveform intersection points is less than those of the plain weave canvas, and rubber sufficiently penetrates not only between yarns of the fabric, but also between the intersection points. When the twill or satin fabric is used over the teeth, direction contact of wefts with warps when the belt bends is avoided to preferably improve belt life.

In the canvas cover, high rigidity yarns are employed as the wefts, and high rigidity yarns responsive to the wefts are employed as the warps. Therefore, the wefts and the warps are balanced to provide a canvas having uniform thickness. As a consequence, the canvas cover has a uniform thickness. The obtained belt has a uniform PLD value to improve belt life. Further, since the canvas cover has wear resistance and sufficient strength, teeth are sufficiently protected to prevent the dedenda of the teeth from cracking and the teeth from cutting out of the canvas.

The PLD is the distance from the center of a core wire to the outer surface of the back of the belt, which can include a canvas cover.

The canvas cover is formed of a material such as polyamide fiber, polyester fiber, aromatic polyester fiber and the like. More specifically, the wefts 5a of the canvas cover can be formed of wooly processed yarns in which filament yarns of 6 nylon, 6.6 nylon having contraction and expansion properties are crimped, and the warps 5b can be formed of filament yarns of 6 nylon or 6.6 nylon.

In addition, mixed twisted yarns of spun yarns containing at least 40 wt.% or more, and preferably 50 wt.% or more, of aromatic polyamide fiber and urethane elastic yarns can be utilized as the wefts 5a, and filament yarns made of fibers of polyamide, polyvinyl alcohol, polyethylene, polypropylene and the like, such as 6 nylon, 6.6 nylon, 4.6 nylon, 12 nylon, and the like, can be utilized as the warps 5b. A configuration of the filament yarns contains 3 to 25 monofilaments each being 10 to 50 denier that are twisted 5 to 30 times/10 cm. A configuration of a multi-filament yarn contains 100 to 200 filaments of aromatic polyamide each being 1 to 6 denier are bundled, or twisted, as multi-filament yarns.

The spun yarns of the aromatic polyamide fiber are preferably draped with urethane elastic yarns to maintain the constant thickness of the canvas and to improve heat resistance and wear resistance. If 40 wt.% or more is not utilized, the heat resistance and the wear resistance may not be improved.

In order to further increase contraction and expansion properties of the above-described toothed belt, other low orientation polyester synthetic fiber yarns can be knitted with the above-described plain weave canvas, twill or satin canvas, and the belt can be covered with the knitted fabric.

Surfaces of the wefts 5a and the warps 5b can be covered with adhesive layers made of a cured resorcin-formalin-rubber latex (RFL) solution (described below), isocyanate solution or epoxy solution.

Figure 4:
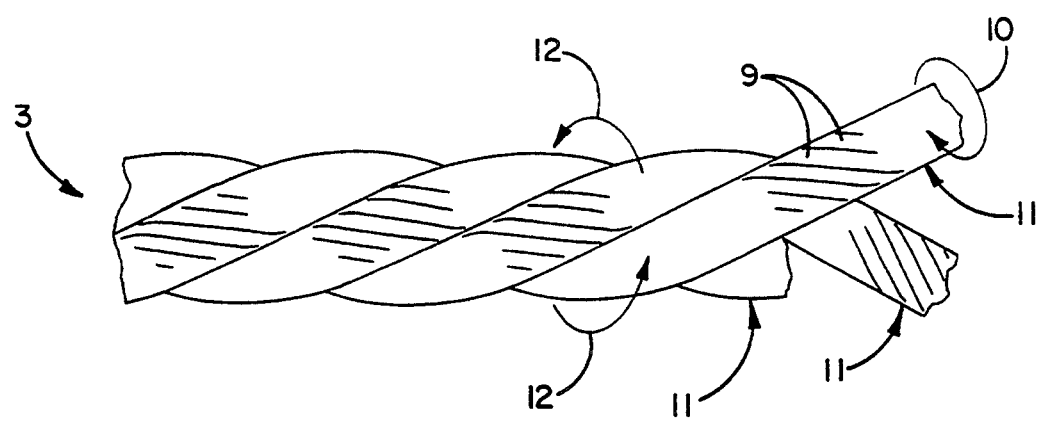
FIG. 4 is a greatly enlarged fragmentary view of the core wire (not to scale) of the tooth belt of FIG. 1.

FIG. 4 is a greatly enlarged fragmentary view of the core wire 3 of the tooth belt 1.

The configuration of glass fiber cords of the core wires 3 are formed, for example, by bundling a number of nonalkaline glass filaments (not shown) each being about 9, or about 9 to about 10, microns in diameter to form a strand 9, then gathering about 3 resultant strands 9 and lower-twisting in one direction, as indicated by arrow 10, the 3 strands 9 about 10.5 to about 13.5 times/10 cm to form a rope 11, and gathering about 6 to about 13 ropes 11 and upper-twisting the ropes 11, in a direction, as indicated by arrow 12, opposite to the lower twisting, by about 6.5 to about 9.5 times/10 cm to produce the core wire 3. Alternatively, the core wire can be described as an ECG 150 3/6 to 3/13.

Suitable glass filaments are commercially available from Nihon Glass Fiber Co.

The glass fiber cords preferably are conventional treated with an adhesive processing agent, e.g., an RFL solution, and overcoated with a rubber paste, to improve adhesion with the rubber. The RFL solution is obtained by mixing the initial condensate of resorcin and formalin with rubber latex. The molar ratio of the resorcin to the formalin is preferably about 1:0.5 to about 1:3 so as to enhance adhesive strength of the treatment.

The initial condensate of the resorcin and the formalin is mixed with the latex so that the resin content, i.e., the initial condensate, is about 2 to about 30 pts.wt. to 100 pts.wt. of the rubber content of the latex. The total solid concentration is then adjusted to about 5 to about 40 wt. % solids using water.

The latex preferably is a latex of styrene butadiene, vinylpyridine terpolymer, chlorosulfonated polyethylene, H-NBR, epichlorohydrin, natural rubber, styrene butadiene rubber, chloroprene, olefin-vinyl ester copolymer, and the like.

Preferably, the RFL solution is applied to the glass strands and cured prior to the glass strands being lower-twisted. The RFL solution can be applied by dipping the filaments into the solution. The RFL solution is then dried, preferably at a temperature of about 130° C. for a time period of about 2 minutes, and then cured, preferably at a temperature in the range of about 250° to about 300° C. for a time period of about 2 minutes.

After the RFL-treated filaments are lower- and upper-twisted to produce the core wire, the core wire is treated with the rubber paste. The rubber paste can be a rubber dissolved in a solvent. Preferred rubbers include CSM and H-NBR. Preferably the rubber of the rubber paste and of the rubber teeth and back are the same. Preferred solvents include methylethylketone and toluene. Preferably, the rubber paste also contains an isocyanate. A preferred isocyanate is polymethylene polyphenylisocyanate. A preferred isocyanate is PAPI-135, manufactured by M D Chemical Co., Ltd.

The rubber paste can be applied to the core wire by dipping the core wire into the rubber paste. The rubber paste on the core wire is solidified by applying an amount of heat effective to cause solidification.

The RFL and rubber paste treated core wire can be heat treated at a temperature of about 160° C. for a time period of about 2 minutes to improve properties.

A toothed belt can be conventionally manufactured by a press-fitting method using the above-described materials.

This invention will be described in more detail with respect to the following examples that are presented by way of illustration and not limitation.

EXAMPLE 1

PREPARATION AND TESTING OF TOOTHED BELTS HAVING CORE WIRES HAVING 8 UPPER TWISTS/10 CM

Samples of 3 glass strands produced from ECG 150 were prepared, dipped in an RFL solution having a formulation shown in TABLE 1 (below), dried, baked and then lower-twisted as shown in TABLE 2 (below) depending upon the sample or comparative sample being made to produce a coated rope. Then, 11 or 13 of the coated ropes were upper-twisted 8.0±0.5 times/10 cm to produce the core wire, dipped in one of the rubber pastes having a formulation shown in TABLE 3 (below), and heat treated at 160° C. for 2 minutes to obtain an RFL and rubber paste treated glass fiber cord having a configuration of ECG 150 3/11 or 3/13.

TABLE 1

| RFL SOLUTION | |
|---|---|
| Solution content | (wt. %) |
| Resorcin | 1 |
| 37 wt. % formalin | 1 |
| JSR 0650[1] | 18 |
| Deionized water | 80 |

[1]Vinylpyridine-styrene butadiene rubber latex commercially available from Japan Synthetic Rubber Co., Ltd.

The canvas cover was formed of twill texture with 6.6 nylon wooly processed yarns and industrial 6.6 nylon wooly processed yarns as wefts and industrial 6.6 nylon yarns as warps with 2/2 (which indicates the structure of the twill texture) of 0.25 millimeter (mm) or 0.30 mm of thicknesses in the section of the belt depending on the sample or comparative sample being produced. The canvas cover was adhered to match to shape of the rubber teeth.

Rubber teeth and back rubber were formed of a rubber composition which contained hydrogenated nitrile rubber or chlorosulfonated polyethylene rubber as main materials. The formulations of the rubbers are shown in TABLE 4 (below).

A toothed belt was manufactured by a conventional press-fitting method of the above materials. The obtained belt had a tooth pitch of 9 degrees, 525 mm of a ZA (trapezoidal shape) toothform, 88 teeth, and was 19.1 mm in width.

Each manufactured belt was tested by a 3-shaft running test. The original strength of the belt was determined. After running for 1000 hours, belt residue strength, the presence or absence of cracks at the dedenda of the teeth, and wearing state of the canvas cover were determined. The results are shown in TABLE 2 (below).

Figure 2:
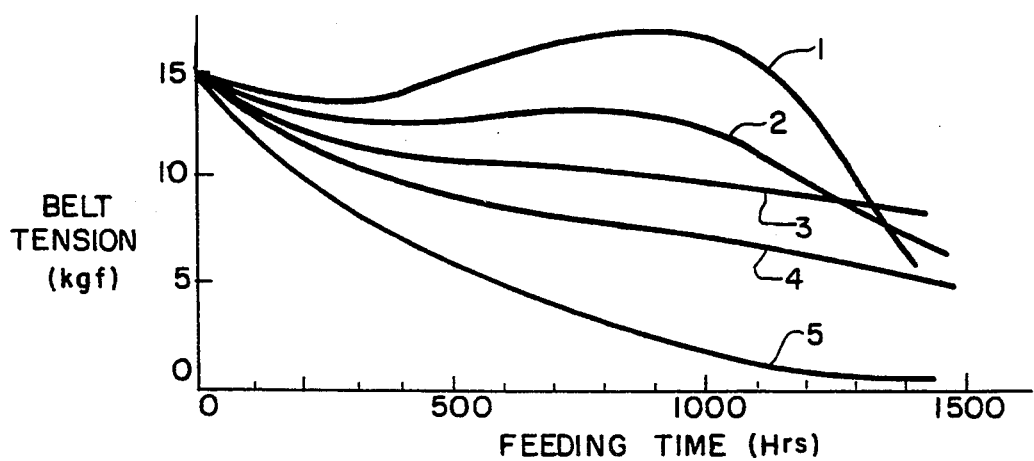
FIGS. 2 and 3 are graphs showing the relationship between the feeding time of the toothed belt and the tension of the belt.
Figure 3:
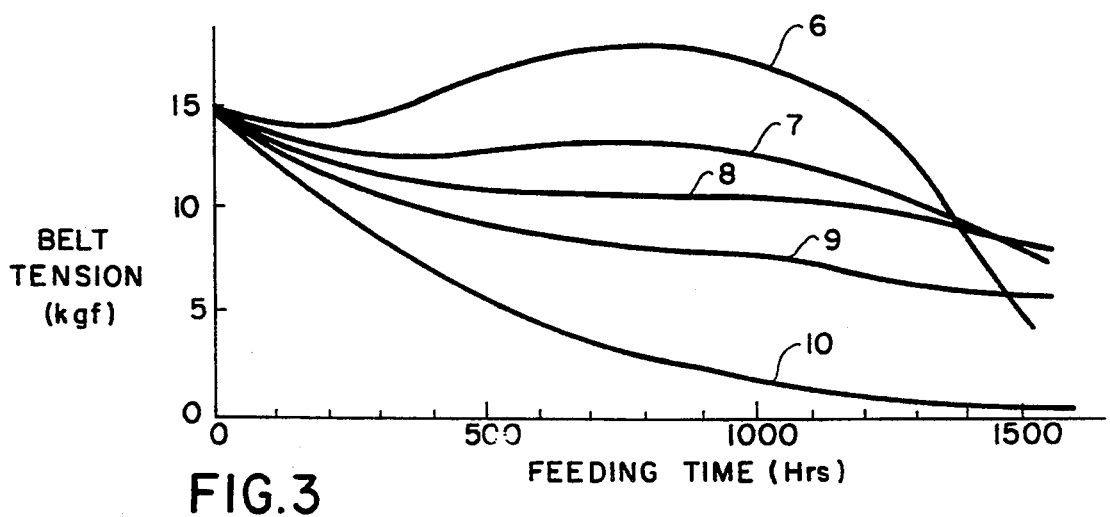

The relationship between the belt running time and the tension of the belt is shown in FIGS. 2 and 3. The tension of the belt was measured by a belt tension gauge to determine an original tension in the 3-shaft running test. The belt was run for a predetermined period indicated on the graphs and the belt and the testing machine were cooled to the ambient temperature and the tension was remeasured.

The 3-shaft running tester had a driving pulley (18 teeth), a driven pulley (36 teeth) and a tension pulley (52 mm in diameter) disposed between the driving pulley and the driven pulley. The test was conducted in an oven set at a temperature of 120° C. and the running conditions included 6000 rpm of rotating speed of the driving pulley, 3000 rpm of rotating speed of the driven pulley, 5 horsepower of load, and 15 kgf of initial tension.

TABLE 4-continued

| H-NBR rubber composition | (pts. wt.) | CSM rubber composition | (pts. wt.) |
|---|---|---|---|
| Accelerator TT[4] | 2 | Accelerator RA[8] | 5 |
| Accelerator CM[5] | 1 | Accelerator PM[9] | 1 |
| Sulfur | 0.5 | | |

[1]Hydrogenated nitrile rubber commercially available from Nippon Zeon Co., Ltd.
[2]N-isopropylene-N'-phenyl-P-phenylenediamine
[3]Dioctyl sebacate
[4]Tetramethylthiuram disulfide
[5]N-cyclohexyl-2-benzothiazyl sulfenamide
[6]Chlorosulfonated polyethylene commercially available from Denki Kagaku Kogyo K.K.
[7]Nickeldibutyldithiocarbamate
[8]Dimethamethylenethiuramtetrasulfide
[9]N,N'-m-phenylenedimaleimide In the toothed belts of COMPARISON SAMPLES NO. 1 and NO.6 (each having 8 lower twists/10 cm), deterioration of the RFL and rubber paste on the glass fiber cords took place early due to an increase in the tension at the time of running resulting in a reduced residual strength and an increase in the wear of the canvas cover. In the belts of COMPARISON EXAMPLES NO. 5 and NO. 10 (each having 16 lower twists/10 cm), variation in the load applied to the teeth was increased due to a decrease in the tension, and the dedenda of the teeth of the belt at the front side of the running direction were cracked. The belts of SAMPLE

TABLE 2

TOOTHED BELTS AND TEST RESULTS

| Belt. No. | COMPARISON SAMPLE 1 | SAMPLES 2 | 3 | 4 | COMPARISON SAMPLES 5 | 6 | SAMPLES 7 | 8 | 9 | COMPARISON SAMPLE 10 |
|---|---|---|---|---|---|---|---|---|---|---|
| Structure of core wires | ECG 150 3/11 | | | | | | ECG 150 3/13 | | | |
| No. of lower twists (times/10 cm) | 8 | 11 | 12 | 13 | 16 | 8 | 11 | 12 | 13 | 16 |
| No. of upper twists (± 0.5 times/10 cm) | | | | | 8 | | | | | |
| Tooth rubber & back rubber | H-NBR | | | | | | CSM | | | |
| Thickness of cover canvas (mm) | 0.30 | | | | | | 0.25 | | | |
| Original Strength of belt (kgf/19.1 mm) | 1050 | 1045 | 1040 | 1045 | 1050 | 1150 | 1170 | 1200 | 1150 | 1120 |
| Residual strength of belt after 1000 hrs (kgf/19.1 mm) | 300 | 450 | 550 | 600 | 650 | 180 | 350 | 470 | 460 | 400 |
| Cracks of dedenda | none | none | none | yes | none | none | none | none | none | yes |
| Wear state of Cover Canvas | large | middle | small | small | small | large | middle | small | small | small |

TABLE 3

(RUBBER PASTE)

| For H-NBR glass core wire | (pts. wt.) | For CSM glass core wire | (pts. wt.) |
|---|---|---|---|
| H-NBR rubber composition (Table 4) | 100 | CSM rubber composition (Table 4) | 100 |
| Methylethylketone | 590 | Toluene | 590 |
| PAPI-135 (mfg. by M D Chemical Co., Ltd.) | 10 | PAPI-135 (mfg. by M D Chemical Co., Ltd.) | 10 |

TABLE 4

| H-NBR rubber composition | (pts. wt.) | CSM rubber composition | (pts. wt.) |
|---|---|---|---|
| Zed pole 2020[1] | 100 | CSM230[6] | 100 |
| Zinc oxide | 5 | Magnesium oxide | 5 |
| Stearic acid | 1 | Stearic acid | 1 |
| Antioxidant[2] | 1 | Antioxidant[7] | 2 |
| FET carbon black | 40 | FET carbon black | 40 |
| Plasticizer[3] | 5 | Plasticizer[3] | 5 |

NOS. 2, 3, 4, 7, 8 and 9 of this invention exhibited preferable tension maintainability, no cracking of the dedendum of the tooth due to variation in the load, preferable residual strength and preferable wear resistance of the canvas cover.

EXAMPLE 2

PREPARATION AND TESTING OF TOOTHED BELT HAVING CORE WIRES HAVING 12 UPPER TWISTS/10 CM

ECG 150 3/13 glass fiber cords similarly to those in the EXAMPLE 1, but which were lower-twisted 12 times/10 cm and upper-twisted 8.0±0.5 times/10 cm, were employed as glass core wires.

The canvas cover was formed having a twill texture of 2/2 from monomulti-yarns as warps and spun yarns and urethane elastic yarns as wefts. The monomulti-yarns were produced from 7 monofilaments with each monofilament being 30 denier and being made of 6.6 nylon. The 7 monofilaments were twisted 15 times/10 cm in an S direction. The material and size of the spun yarns are shown in TABLE 5 (below). The urethane elastic yarns were elongated about 2.0 to about 4.0 times their original length at the time of twisting. The spun yarns and urethane elastic yarns were mixed and twisted in an S direction. The urethane elastic yarn was made of elastomeric (spandex) fibers.

The canvas woven in this manner was contracted to about 40 to about 55% of weaving width by a wince or a circular machine. The canvas was then treated with the RFL solution having the formulation shown in TABLE 1 (above) and immersed in the H-NBR rubber paste having the formulation shown in TABLE 3 (above), dried, and then used as a canvas cover of the toothed belt.

The rubber teeth and back rubber were formed of a rubber composition which contained hydrogenated nitrile rubber as the main material. The rubber composition is disclosed in TABLE 4 (above).

The above materials were used to make a toothed belt (SAMPLE 11) by the method and with the configuration described in EXAMPLE 1, above. The original strength of the belt was determined. Under the same testing conditions, after running for 1000 hours, belt residual strength, cracks at the dedenda of the teeth, and wearing state of the canvas cover were determined. Also, belt tensions originally and after a predetermined time period were examined. The results are shown in TABLE 5.

TABLE 5

TEST RESULTS FOR SAMPLE 11

| | |
|---|---|
| Core wire structure | ECG 150 3/13 |
| No. of lower twists (times/10 cm) | 12 |
| No. of upper twists (times/10 cm) | 8 |
| Tooth rubber & back rubber | H-NBR |
| Cover canvas | |
| Material of weft | (spun yarns) & urethane elastic yarns |
| Format of weft | (CX[1]$_{30}$S/3 + SD[2]$_{140}$D/1) /1 |
| No. of twists of weft (times/10 cm) | 15 |
| No. of twists of warp (pieces/5 cm) | 110 |
| No. of fitted wefts (pieces/5 cm) | 80 |
| Original strength of belt (kgf/19.1 mm) | 1175 |
| Residual strength of belt after 1000 hrs (kgf/19.1 mm) | 710 |
| Cracks of dedenda | None |
| Wear of cover canvas | Small |
| Tension of belt (kgf) | |
| 0 hr | 16.2 |
| 1.5 hr | 14.0 |
| 20.5 hrs | 13.2 |
| 500 hrs | 10.0 |
| 1500 hrs | 9.0 |

[1] CORMEX (manufactured by Teijin Limited)
[2] Urethane elastic yarn

As discussed above, a belt having the above-mentioned core wires and canvas cover maintains its tension after running for 500 hours or longer, has no crack at the dedenda of the teeth due to variation in the load, and preferably provides residual strength of the belt and provides wear resistance of the canvas cover.

As discussed above, the toothed belt according to the invention has core wires having about 10.5 to about 13.5 times/10 cm lower twists and about 6.5 to about 9.5 times/10 cm upper twists. Variation in the tension of the belt during running time is reduced, the flex fatigue of the belt scarcely occurs and the cracks of the dedenda of the teeth hardly take place thereby improving the durability of the belt due to the core wires.

This invention has been described in terms of specific embodiments set forth in detail, but it should be understood that these are by way of illustration only and that the invention is not necessarily limited thereto. Modifications and variations will be apparent from this disclosure and may be resorted to without departing from the spirit of this invention, as those skilled in the art will readily understand. Accordingly, such variations and modifications of the disclosed products are considered to be within the purview and scope of this invention and the following claims.

We claim:

1. A rubber toothed belt comprising rubber teeth, a rubber back and at least one core wire imbedded in the rubber back, the core wire having lower twists of about 11 to about 13.5 times/10 cm and upper twists of about 6.5 to about 9.5 times/10 cm.

2. The rubber toothed belt in accordance with claim 1 wherein the upper twist of the core wire is about 8 times/10 cm.

3. The rubber toothed belt in accordance with claim 1 wherein the core wire has a construction of ECG 150 3/6 to 3/13.

4. The rubber toothed belt in accordance with claim 1 wherein the core wire has a construction of ECG 150 3/11.

5. The rubber toothed belt in accordance with claim 1 wherein the rubber is a chlorosulfonated polyethylene rubber, an alkylated chlorsulfonated polyethylene rubber or a hydrogenated acrylonitrile butadiene rubber.

6. The rubber toothed belt in accordance with claim 1 wherein the core wire is treated with at least one of a resorcin-formalin-rubber latex or a rubber paste.

7. The rubber toothed belt in accordance with claim 6 wherein the rubber paste is made of the same rubber as the rubber back.

8. The rubber toothed belt in accordance with claim 1 further comprising a canvas cover.

9. The rubber toothed belt in accordance with claim 8 wherein the teeth are covered with the canvas cover.

10. A rubber toothed belt comprising rubber teeth, a rubber back and at least one glass core wire imbedded in the rubber back, the glass core wire having lower twists of about 11 to about 13.5 times/10 cm, upper twists of about 6.5 to about 9.5 times/10 cm and having a construction of ECG 150 3/6 to 3/13.

11. The toothed belt in accordance with claim 10 wherein the core wire has an upper twist of about 8 times/10 cm.

12. The toothed belt in accordance with claim 10 wherein the core wire has a construction of ECG 150 3/11 to ECG 150 3/13.

13. The toothed belt in accordance with claim 10 further comprising a canvas cover.

14. A rubber toothed belt comprising rubber teeth, a rubber back, a canvas cover over the teeth and at least one glass core wire, the glass core wire having lower twists of about 11 to about 13.5 times/10 cm, upper twists of about 6.5 to about 9.5 times/10 cm and having a construction of ECG 150 3/6 to 3/13.

15. A belt comprising a rubber back and a core wire imbedded in the rubber back, the core wire having lower twists of about 11 to about 13.5 times/10 cm and upper twists of about 6.5 to about 9.5 times/10 cm.

* * * * *